(12) United States Patent
Lee et al.

(10) Patent No.: US 7,171,065 B2
(45) Date of Patent: Jan. 30, 2007

(54) COMPACT OPTICAL DEVICES AND METHODS FOR MAKING THE SAME

(75) Inventors: Michael G. Lee, San Jose, CA (US); Kishio Yokouchi, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/084,462

(22) Filed: Mar. 17, 2005

(65) Prior Publication Data

US 2006/0210216 A1   Sep. 21, 2006

(51) Int. Cl.
*G02B 6/42* (2006.01)
*G02B 6/26* (2006.01)

(52) U.S. Cl. .......................................... 385/14; 385/40

(58) Field of Classification Search ...................... None
See application file for complete search history.

(56) References Cited

U.S. PATENT DOCUMENTS

| | | | | | |
|---|---|---|---|---|---|
| 4,159,452 | A | * | 6/1979 | Logan et al. | 372/45.01 |
| 4,952,015 | A | * | 8/1990 | Van Ruyven | 385/14 |
| 5,159,699 | A | * | 10/1992 | de Monts | 385/14 |
| 6,711,312 | B1 | * | 3/2004 | Kornrumpf et al. | 385/14 |

* cited by examiner

*Primary Examiner*—Sung Pak
(74) *Attorney, Agent, or Firm*—Sheppard Mullin Richter & Hampton LLP

(57) ABSTRACT

Compact optical devices and methods of constructing the same are disclosed. The optical devices are formed with perpendicular orientations to the surface of a supporting layer (e.g., substrate), and have three-dimensional structures rather than planar structures. The optical devices can be formed with high density on supporting layers without the need for several built-up layers. Maintaining the processing temperatures within the cure profiles of polymer optical layers is readily achieved.

28 Claims, 9 Drawing Sheets

FIG. 1 *(PRIOR ART)*

COMPACT OPTICAL DEVICES AND METHODS FOR MAKING THE SAME

FIELD OF THE INVENTION

The present invention relates to optical devices and optoelectric devices, such as switches, modulators, splitters, combiners, and the like, formed on substrates, and methods for making the same.

BACKGROUND OF THE INVENTION

In data networking systems and computer systems, information signals can be conveyed by light, particularly over long distances. In general, an information-bearing light signal may be generated by one of two approaches. In the first approach, the light signal is generated directly from a light-emitting device whose electrical input is varied to modulate and the light output of the device in relation to the information signal. This generally involves varying the current passing through a semiconductor laser or LED. In the second approach, the output of the constant light source is run through an optical modulator, which varies the amount of light transmitted through itself. The first approach has constraints in terms of output power, modulation speed, extinction ratio, nonlinear-modulation effects, and wavelength chirp. These constraints, in turn, impact several characteristics such as spacing between amplifiers, transmission capacity, transmission distance and receiver performance, distorted signals, and dispersion. All these become more and more significant at data rates above 1 Gbit/sec. Most of these problems are solved by using the second approach (optical modulator), particularly for high-performance systems. However, optical modulation requires a change in the transparency of the modulator material, and only a few physical processes can be fast enough and complete enough to be useful.

Fiber-optic systems and next-generation optical computing systems are extremely demanding for high performance modulation because they require modulators that can switch on and off as often as billions of times in a second, as well as respond very accurately to changes in the input signal. Although a number of technologies have been developed for modulating laser beams, only a few are in practical use, and still fewer meet the strict requirements for the systems. For example, liquid crystals do modulate light, but they are not fast enough for data networking and computing systems.

Electro-optic modulation generally relies upon the electro-optic effect, which is a change in the refractive index of a material in response to the application of an electric field to the material. The change in refractive index affects light passing through the material virtually instantaneously. Increasing the refractive index slows down the light, while decreasing the refractive index speeds up the light. The change is, in general, proportional to the voltage applied to the material.

In a Mach-Zehnder modulator, an input single-mode waveguide is split into two separate waveguide branches (typically of equal length), and then recombined into an exit waveguide after traveling some distance. Since the propagation distance in the modulator branches is short, the light beams in the two separate branches are coherent because they originate from the same source. An electric field is applied to one branch to change the refractive index in the branch (which either decreases or increases the speed of light depending on the direction of electric field), and to thereby create a difference in the propagation speeds of light in the two branches. This in turn creates a phase difference in the light beams. When the phase difference is near or at 180 degrees (one-half wavelength), the two beams will interfere with each other when combining at the exit waveguide, and little to no light will be propagated through the modulator. When the phase difference is at or near zero degrees, the two light beams constructively combine with one another at the exit waveguide to allow the light to propagate through the modulator essentially unchanged. The electric field may be varied between two extreme values, thereby giving the optical modulator a digital on-off transmission characteristic. The electric field may also be varied through a continuum of values to cause the output light intensity to vary in a corresponding continuum of values, which would be suitable for analog modulation applications.

In many electro-optic modulators, electric fields are applied across both waveguides, with the same polarity if the two arms have opposite dipole orientations or with the opposite polarities if the two arms have the same dipole orientation. This approach causes an increase in speed of one light beam and a decrease in speed of the other light beam, and it provides the same modulation but with lower operating electric fields, and correspondingly lower operating voltages. Typically two voltage signals are applied to each branch in a superimposed manner, a bias voltage that sets the operating level and a modulation signal voltage conveys the signal content. For example, the bias voltage may set the modulator to normally transmit half of the power of the input light beam to the output, while the modulation signal voltage varies to incrementally change the transmitted power above and below that midpoint level.

Unfortunately, the electro-optical coefficients of common electro-optic materials are relatively low, which requires the modulators to use relatively long waveguide branches in order to generate a sufficient phase changes with the relatively low electro-optic coefficients. The long waveguide branches take up considerable space on the substrate, and limit the density at which the modulators can be formed on the substrate. Accordingly, there is a need to increase the density of modulators on substrates.

SUMMARY OF THE INVENTION

Exemplary optical devices according to the present invention are formed with perpendicular orientations to the surface of the substrate, and have three-dimensional structures rather than planar structures. Because they are not stacked on top of each other, exemplary optical devices according to the present invention can be formed with high density on substrates without the need for several built-up layers. Consequently, maintaining the processing temperatures within the cure profiles of the optical layers is readily achieved, and one does not need to maintain layer planarity in order to achieve high density.

A first exemplary optical device according to the present invention comprises a support layer having a top surface and a bottom surface, and five waveguide segments configured as follows. A first waveguide segment is disposed above the top surface, and has a first end, a second end, and an axis of light propagation spaced above the top surface by a first height. A second waveguide segment is disposed above the top surface, and has a first end, a second end, and an axis of light propagation spaced above the top surface by a second height, the second height being less than the first height. A third waveguide segment is disposed above the top surface, and has a first end, a second end, and an axis of light propagation spaced above the top surface by a third height, the third height being greater than the first height and the second height. A fourth waveguide segment couples the second end of the first waveguide segment to the first end of the second waveguide segment, and a fifth waveguide segment couples the second end of the first waveguide segment to the first end of the third waveguide segment. Each waveguide segment comprises a core segment having an elongated body with at least one lateral side. Each core segment is surrounded on at least one of its lateral sides by cladding material. Other lateral sides may be surrounded by a gas, such as air. The construction of the above five waveguide segments can provide for vertically-oriented, compact passive components, such as optical splitters and optical combiners. With the addition of electrodes and the use of electro-optical material, the above construction can provide for compact active optical components, such as branch switching devices and multiplexers.

A second exemplary embodiment according to the present invention comprises the above-described first exemplary embodiment, plus a sixth waveguide segment, a seventh waveguide segment, and an eighth waveguide segment. The sixth waveguide segment is disposed above the top surface, and has a first end, a second end, and an axis of light propagation spaced above the top surface by a fourth height. The fourth height is preferably equal to or greater than the second height, and less than or equal to the third height. The seventh waveguide segment couples the second end of the second waveguide segment to the first end of the sixth waveguide segment, and the eighth waveguide segment couples the second end of the third waveguide segment to the first end of the sixth waveguide segment. With the addition of electrodes and electro-optic material, the construction of the second exemplary embodiment can provide for vertically-oriented, compact optic modulators, such as Mach-Zehnder modulators.

Accordingly, it is an object of the present invention to increase the density of optical devices and opto-electric devices, such as switches, modulators, splitters, combiners, and the like, on a substrate.

It is yet another object of the present invention to increase the device density without having to increase the number of material layers used in the construction of the devices.

It is yet another object of the present invention to reduce the amount of electrical interference between adjacent opto-electric devices.

DETAILED DESCRIPTION OF THE INVENTION

High-speed modulators are of great interest for 40 Gb/s transmission systems and their successors. The most commonly used materials for modulators are $LiNbO_3$ and the III-V semiconductor compounds GaAs and InP. The $LiNbO_3$ material has the advantage of low optical losses and the recent advantage of low driving voltages, but cannot easily be integrated with other components, such as amplifiers. The GaAs and InP materials are generally provided in chip or substrate form, and can therefore be easily integrated with other components, such as amplifiers. In general, electro-optic modulators can be made of any material that exhibits the electro-optic effect and that is transparent at the wavelength of the optical signal. Electro-optical polymers have received more and more attention for applications of electro-optic modulation, mainly because of their potential for high-frequency modulation, and their relatively easy processibility.

Figure 1:
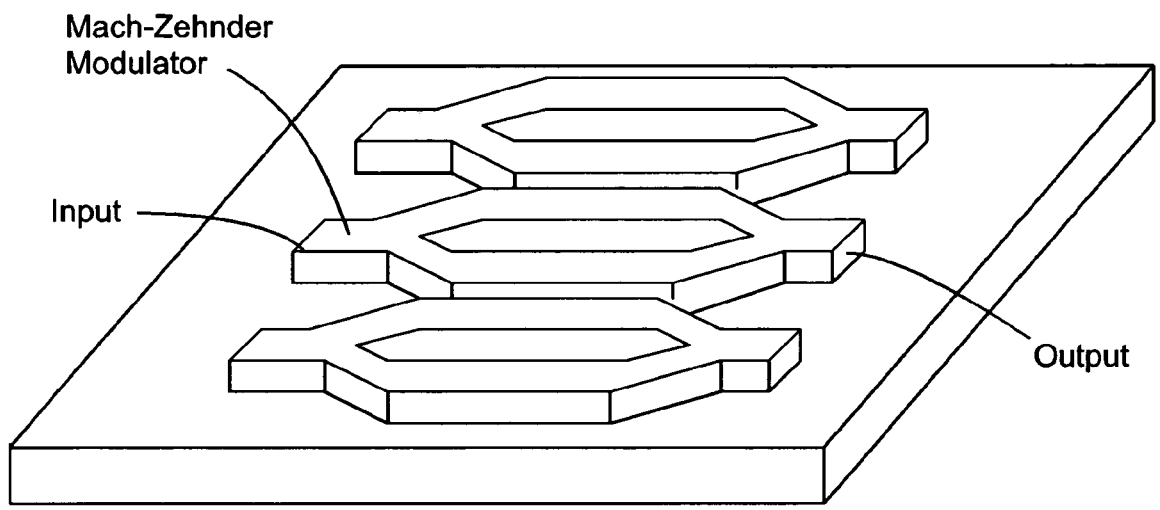
FIG. 1 shows a plurality of conventional Mach-Zehnder modulators formed on a common substrate according to the prior art.

FIG. 1 shows a plurality of conventional Mach-Zehnder modulators formed on a common substrate. This conventional configuration encounters limitations in several respects. First, only a limited number of polymer optical layers and other required layers can be built on top of one another while maintaining the processing temperatures within the cure profiles of all the layers, and while maintaining planarity in the topmost layer. This typically limits to two the number of devices that can be stacked over one another. As a second limitation, electrodes of opposite polarities are inevitably placed adjacent to each other due to the planar nature of the substrate. This increases the spacing distance needed between modulator devices in order to reduce electrical interference between electrodes, and consequently limits the maximum density at which modulators can be made on the substrate. Additionally, in order to reduce optical interference between modulator branches, the Mach-Zehnder modulator needs a spacing distance between waveguide branches that is between two and ten times the width of a waveguide branch. This further reduces the maximum density at which the modulators can be disposed on a substrate.

Figure 2:
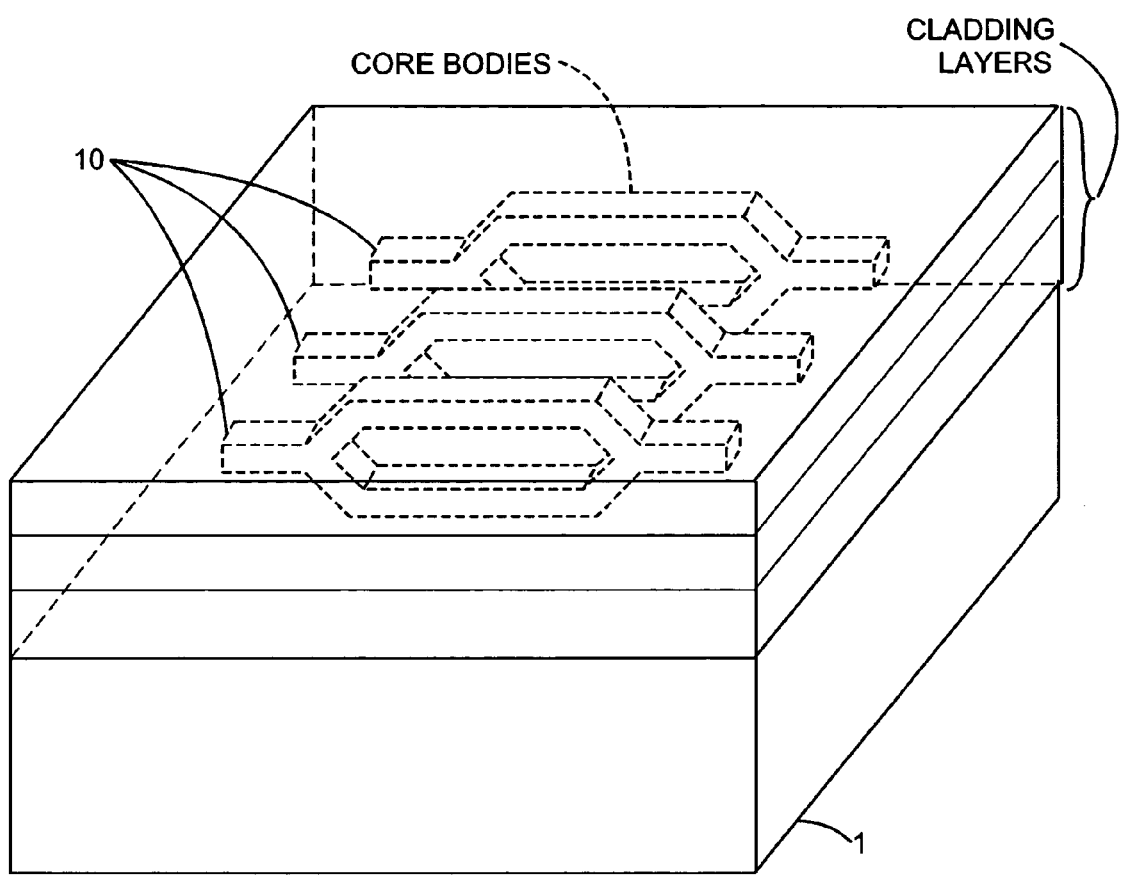
FIG. 2 shows a perspective view of a plurality of exemplary compact optical devices according to the present invention.

FIG. 2 shows a plurality of exemplary compact optical devices 10 according to the present invention formed on a substrate 1. For the purpose of illustrating the present invention, optical devices 10 comprise Mach-Zehnder modulators; however, it may be appreciated that optical devices 10 may comprise passive devices such as splitters and combiners, and active devices such as branch switches. (Such passive and active devices only required a subset of the components used by a Mach-Zehnder modulator.) As can be seen in the figure, each optical device 10 is formed perpendicular to the surface of the substrate, and therefore has a three-dimensional structure rather than a planar structure. Because they are not stacked on top of each other, optical devices 10 can be formed with high density on substrate 1 without the need for several built-up layers. Consequently, maintaining processing temperatures within the cure profiles of the optical layers is easily achieved, and one does not need to maintain layer planarity in order to achieve high density. Moreover, the structure of optical devices 10 enables electrodes of the same polarity to be adjacent to one another, thereby significantly reducing electrical interference between adjacent modulators. For example, the positively biased electrodes can all be on the top side and the negatively biased electrodes can be on the bottom side. In this way, interference between electrodes is greatly reduced compared to the conventional planar Mach-Zehnder modulators, and therefore the modulators can be packed much more closely to enable higher densities and channel counts.

Figure 3:
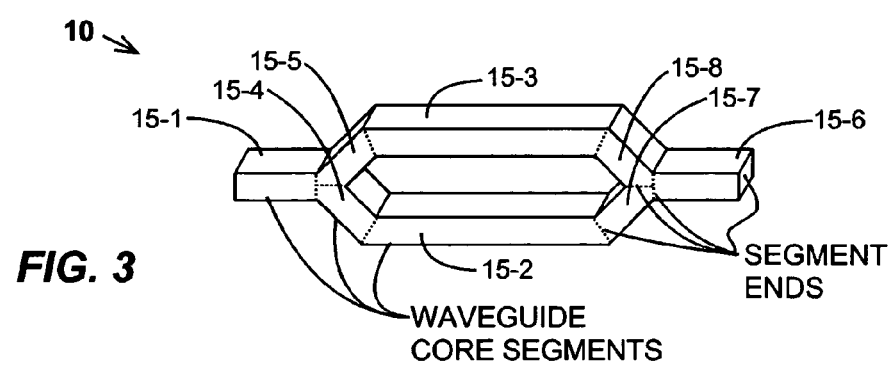
FIG. 3 shows a perspective view of an exemplary compact optical device according to the present invention.

Referring simultaneously to FIGS. 2 and 3, optical device 10 comprises eight core segments 15-1 through 15-8, with each core segment comprising an elongated body with at least one lateral side, and with each core segment being surrounded on at least one of its lateral sides by cladding material to provide eight corresponding waveguide segments. Each core segment 15-1 through 15-8 (and each corresponding waveguide segment) comprises a first end, a second end, and an axis of light propagation going from one end to the other. Without loss of generality, we will designate the first end as being the leftmost end shown in FIG. 3, and the second end as being the rightmost end. The first core segment 15-1 is disposed above the top surface of the substrate (the substrate is shown in FIG. 2), with its axis of light propagation spaced above the top surface by a first height (H1 in FIG. 14). Second core segment 15-2 is disposed above the substrate's top surface, with its axis of light propagation spaced above the top surface by a second height (H2 in FIG. 14), the second height being less than the first height. Third core segment 15-3 is disposed above the substrate's top surface, with its axis of light propagation spaced above the top surface by a third height (H3 in FIG. 14), the third height being greater than the first and second heights. Fourth core segment 15-4 couples the second end of first core segment 15-1 to the first end of second core segment 15-2, and fifth core segment 15-5 couples the second end of first core segment 15-1 to the first end of third core segment 15-3.

The structure of the first five waveguide cores 15-1 through 15-5 is sufficient to provide for passive components such as optical splitters and optical combiners. In an optical splitter, light from core segment 15-1 (traveling left to right in the orientation shown in FIG. 3) can be equally split to core segments 15-2 and 15-3 via core segments 15-4 and 15-5, respectively. (If desired, unequal splitting can also be achieved by making unequal cross-sectional areas at the interface of the second end of core segment 15-1 with the first ends of core segments 15-4 and 15-5). In an optical combiner, light from core segments 15-2 and 15-3 (traveling from right to left in the orientation shown in FIG. 3) can be combined into core segment 15-1 via core segments 15-4 and 15-5, respectively. With the addition of electrodes and the use of electro-optic materials, the structure of the first five waveguide cores 15-1 through 15-5 is also sufficient to provide for active components such as branch switching devices and multiplexers. For example, core segments 15-4 and 15-5 may comprise electro-optic material that acts like the surrounding cladding material in the absence of an electric field, and acts like core material in the presence of an electric field. Electrodes may be disposed on either side of each of core segments 15-4 and 15-5 to apply electric fields to the electro-optic material. For light traveling from left to right in the figure, a branch optical switch (e.g., de-multiplexer) may thereby be provided. For light traveling from right to left in the figure, an optical selection switch (e.g., multiplexer) may be provided.

The addition of core segments 15-6 through 15-8, and the provision of electro-optic material for one or both of core segments 15-2 and 15-3 and/or for the cladding material adjacent to them, provide for a Mach-Zehnder modulator. Sixth core segment 15-6 is disposed above the top surface of the substrate (the substrate is shown in FIG. 2), with its axis of light propagation spaced above the top surface by a fourth height (H4 in FIG. 14). The fourth height (H4) is generally the same as the first height (H1), but may be different. In any event, the fourth height is generally between the second and third heights (H2<H4<H3). Seventh core segment 15-7 couples the second end of second core segment 15-2 to the first end of sixth core segment 15-6, and eighth core segment 15-8 couples the second end of third core segment 15-3 to the first end of sixth core segment 15-6. With the addition of electrodes and the provision of electro-optic material, as described below in greater detail, a Mach-Zehnder modulator is provided, with an input being provided by the first end of first core segment 15-1 and an output being provided by the second end of sixth core segment 15-6 (or vice versa).

Figure 4:
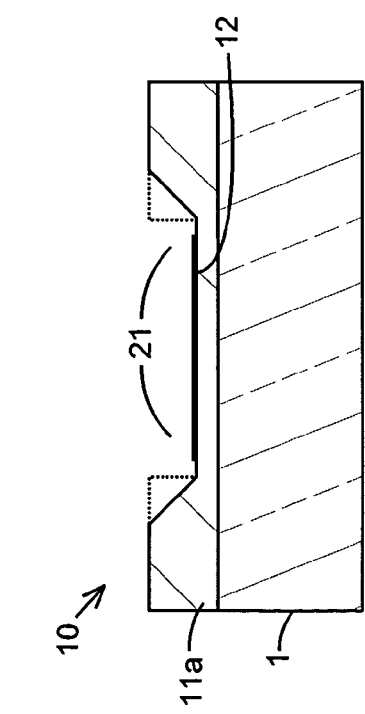
Figure 5:
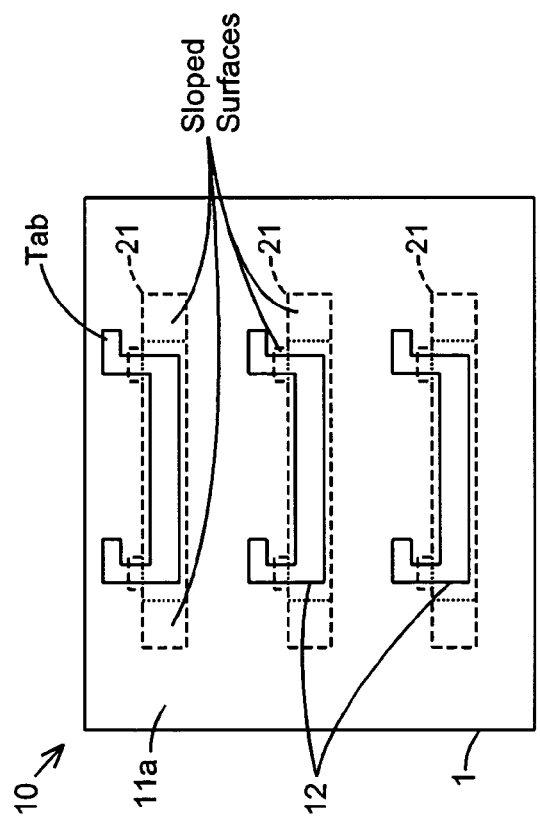

Exemplary methods for forming optical devices 10 according to the present invention are illustrated in FIGS. 4–15. The placement and formation of electrodes for active forms of the optical devices will be illustrated by these methods and corresponding figures. Referring to FIG. 4, a first lower cladding layer 11a is formed over the top surface of a substrate 1. A polymeric material is preferably used for lower cladding layer 11a, but inorganic materials, such as poly glasses, may be used. Next, a recess 21 with sloped surfaces is formed in lower cladding layer 11a, as shown in FIG. 4. Typically, the angle of the sloped surfaces is relatively low, being in the range of 10 degrees to 30 degrees. Recess 21 will serve as a mold in which the core bodies of the lower branch waveguides (15-4, 15-2, and 15-7) will be formed. A grayscale mask may be used to define the slope of the sloped surfaces, and first lower cladding layer 11a may comprise a photosensitive material which can be directly photo-patterned through the grayscale mask. As another approach, recess 21 may be defined in cladding layer 11a by anisotropically etching through a pattern mask that is disposed over cladding layer 11a and that has sloped surfaces located above the sloped surfaces of recess 21. The pattern mask may comprise a photosensitive material, and the sloped surfaces may be formed by a grayscale mask. The anisotropic etching may be accomplished by a suitable plasma-etching process. Grayscale masks are known to the photo-processing art, and a detailed description thereof is not needed for one of ordinary skill in the art to employ one to make the structure shown in FIG. 4. If a polymeric material has been used for cladding layer 11a, and if an electrode is to be formed over the layer, layer 11a is preferably cured or partially cured to improve the adhesion of the metal electrode to it. The formation, pattern definition, and curing of polymeric cladding and core materials is well-known to the art, and detailed descriptions thereof are not needed herein in order for a person having ordinary skill in the art to make and use the present invention.

If vertical electrodes are used in the optical devices 10, metal electrodes 12 are next formed at the bottom of recess 21, such as by depositing a layer of metal followed by masking and pattern etching. The result of this step is shown in FIG. 4, and in the top plan view of FIG. 5. At least one small tab of metal electrode 12 is extended to the side of recess 21 (and to the side of where the core body of the branch waveguide will be formed) so that a via contact may be readily made to electrode 12 during a later fabrication step, and so that the via can be positioned without crossing the core segments that will be formed later. A portion of the side wall of recess 21 may have a sloped surface where the tab is to be formed so as to minimize any chance of breakage in the electrode material during the fabrication process. For low-speed modulator applications, only one tab per electrode is needed. For high-speed modulator applications, two or more electrodes of the modulator are designed as microstrip lines, which generally require at least two tabs per electrode, with each tab being located near a distal end of the electrode. A high-frequency electrical signal is launched at one end of the electrode by one of the tabs. The electrical signal propagates along the length of the electrode, and is collected by the other tab, which feeds the signal into a terminating impedance to prevent back reflections. The details of the electrode construction may be found in various prior art documents, and are not essential for practicing the present invention. For the sake of generality, two tabs per electrode are shown, with the understanding that some of the electrodes will need only one tab in many applications.

Figure 6:
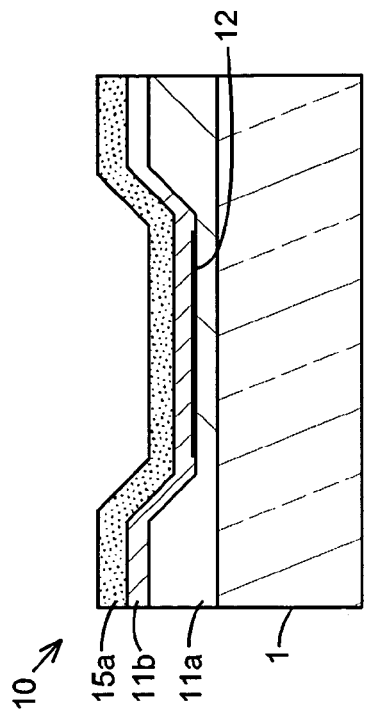
FIGS. 4–15 illustrate an exemplary method of forming compact optical devices according to the present invention.
Figure 7:
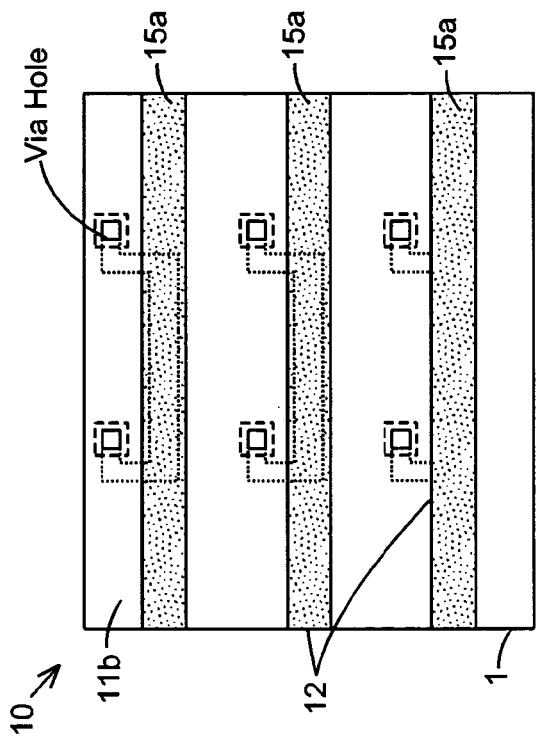

Referring to FIGS. 6 and 7, a second lower cladding layer 11$b$ is conformally formed over the first cladding layer 11$a$ and electrode 12. The thickness of cladding layer 11$b$ typically ranges between 5 μm and 10 μm when the light conveyed through core segments 15 is single-mode, and typically ranges between 15 μm and 30 μm when the conveyed light is multimode. (Layers thicker than about 12 μm are typically made from several thinner conformal layers of material.) As illustrated in FIG. 7, small portions of second cladding layer 11$b$ are removed in locations that overlie the tabs to electrodes 12. This step creates via holes to the tabs. In a subsequent step, conductive material is deposited in the via holes to make electrical contact with the tabs and to form vias. If a polymeric material is used for second cladding layer 11$b$, the layer may then be partially cured to fully cured, so as to increase its resistance to subsequent etching or developing steps used to define subsequent layers. Next, a first core layer 15$a$ is conformally formed over second lower cladding layer 11$b$, and thereafter patterned to define elongated strips of core material, as shown in the top plan view of FIG. 7. First core layer 15$a$ may comprise a photosensitive material, and can be defined by conventional photolithography techniques. After it is patterned, the strips of core layer 15$a$ may be partially cured or fully cured to increase their resistance to subsequent patterning steps for subsequently formed layers. Second cladding layer 11$b$ provides an optical spacing distance between electrodes 12 and the strips of first core layer 15$a$. The thickness of first core layer 15$a$ typically ranges between 5 μm and 9 μm when the light conveyed through core segments 15 is single-mode, and typically ranges between 12 μm and 30 μm when the conveyed light is multimode. Layers greater than about 12 μm are typically made from several thinner conformal layers of material.

Figure 8:
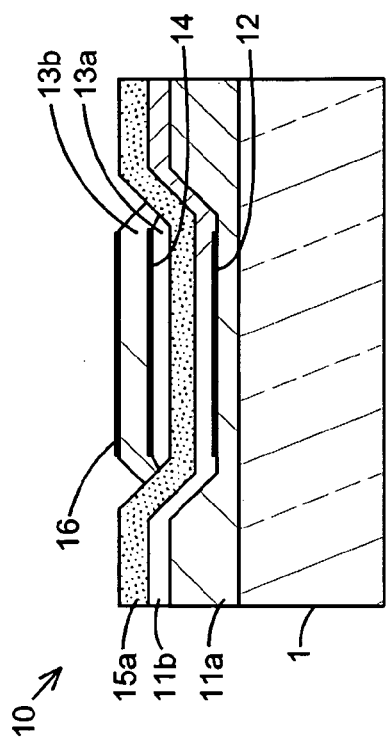
Figure 9:
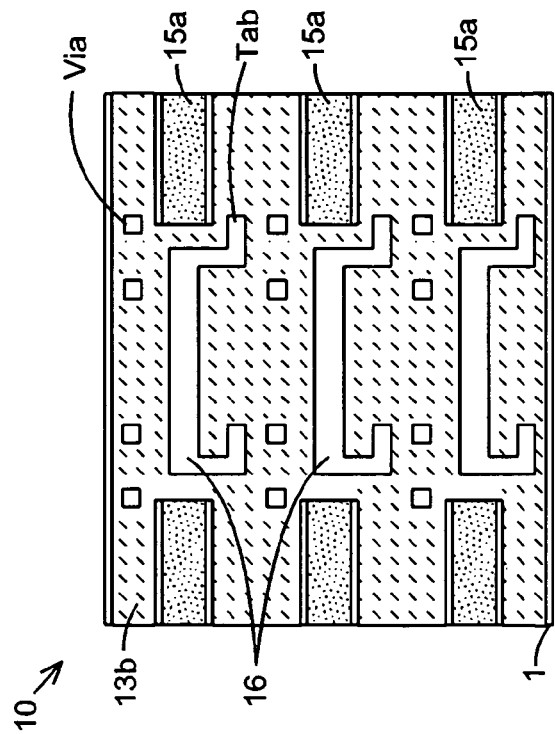

Next, referring to FIGS. 8 and 9, a first intermediate cladding layer 13$a$ is formed and patterned. Preferably, layer 13$a$ comprises a polymeric material, and is partially cured or fully cured after it has been patterned. Cladding layer 13$a$ may comprise a photosensitive material, and may be patterned by conventional photolithography techniques. The thickness of cladding layer 13$a$ is typically the same as that of second lower cladding layer 11$b$, values of which were given above. Next, a second electrode 14 is formed in a manner similar to that described for first electrode 12. Like first electrode 12, second electrode 14 is shown having two tabs. The partial curing or full curing of polymeric cladding layer 13$a$ improves the adhesion of electrode 14 to layer 13$a$. Intermediate cladding layer 13$a$ provides an optical spacing distance between electrode 14 and the strips of first core layer 15$a$, and in this regard serves a similar function as second lower cladding layer 11$b$. First intermediate cladding layer 13$a$ need only be disposed in the areas where the second electrodes 14 are located. However, as seen in FIG. 9, layer 13$a$ can be extended out to cover the low-lying areas of the substrate surface in order to improve the planarity of the substrate surface. In this case, via holes are formed in layer 13$a$ in the areas located over the previously-formed via connections to first electrodes 12. The via holes in layer 13$a$ are filled with conductive material that makes electrical contact to the previously formed vias, thereby making stacked vias.

Figure 10:
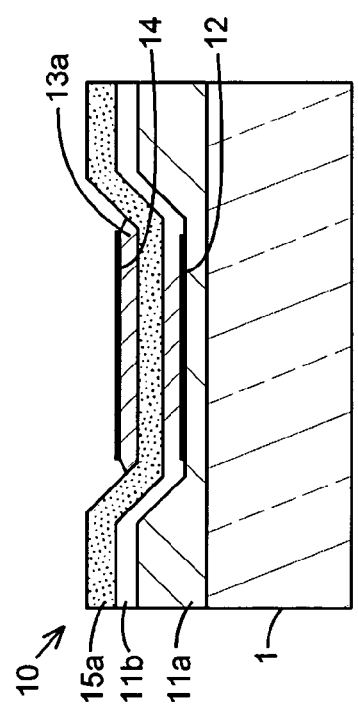
Figure 11:
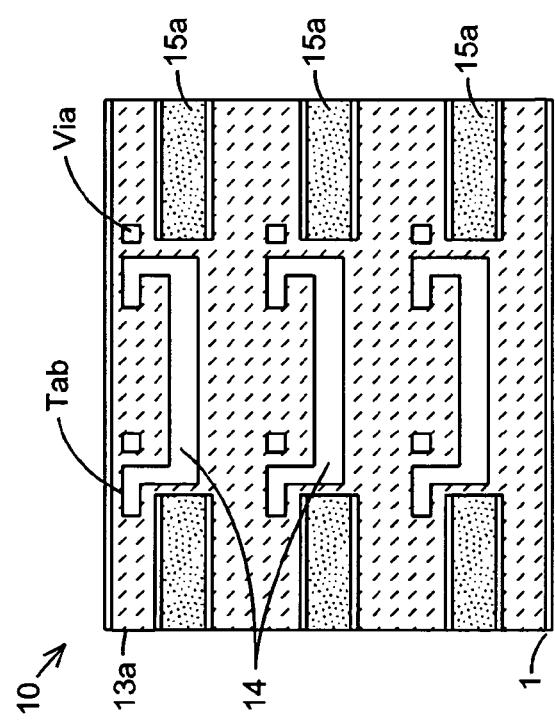

Next, referring to FIGS. 10 and 11, a second intermediate cladding layer 13$b$ is formed and patterned. Preferably, layer 13$b$ comprises a polymeric material, and is partially cured or fully cured after it has been patterned. Cladding layer 13$b$ may comprise a photosensitive material, and may be patterned by conventional photolithography techniques. Second intermediate cladding layer 13$b$ need only be disposed in the areas where third electrodes 16 are located. However, as seen in FIG. 11, layer 13$b$ can be extended out to cover the low-lying areas of the substrate surface in order to improve the planarity of the substrate surface. In this case, via holes are formed in layer 13$b$ in the areas located over the previously-formed via connections to electrodes 12 and 14. The via holes in layer 13$b$ are filled with conductive material that makes electrical contact to the previously formed vias, thereby making stacked vias.

For many applications, the potentials on electrodes 14 and 16 will be substantially the same, and thus there is usually no need to set the thickness of layer 13$b$ to achieve an acceptable degree of electrical isolation between electrodes 14 and 16. In this case, the thickness of layer 13$b$ may be made relatively small, or the layer may be eliminated and electrodes 14 and 16 may be merged together. However, in some applications, electrodes 14 and 16 will have different modulating voltages, and it will be important to have a sufficient thickness for layer 13$b$ in order to minimize the electrical capacitance between electrodes 14 and 16. In this case, the designer can determine the acceptable degree of capacitance, and from that can calculate the minimum thickness of layer 13$b$ using well-known formulas and the dielectric constant of layer 13$b$. The thickness of layer 13$b$ can also be used to provide a desired taper at the ends of the strips of the first and second core layers 15$a$ and 15$b$ (15$b$ being formed in a subsequent step). A larger thickness of layer 13$b$ enables a steeper taper.

The ends of layer 13$b$ are preferably tapered downward to facilitate the subsequent interconnection of the strips of second core layer 15$b$ to the strips of first core layer 15$a$. The taper can be achieved by a number of approaches. A straightforward approach comprises using a positive-tone photosensitive material for layer 13$b$, and patterning layer 13$b$ with a grayscale photolithographic mask. The grayscale mask would be completely opaque in those areas where layer 13$b$ is placed, would be highly transparent in those areas where layer 13$b$ is to be completely removed, and would have a gradation of opacity in the areas where tapering is to occur. An aerial view of the extent of layer 13$b$ is shown in FIG. 11. The tapered areas of layer 13$b$ are small rectangular areas, each being located between an end of an electrode 16 and the adjacent exposed portion of first core layer 15$a$.

Figure 12:
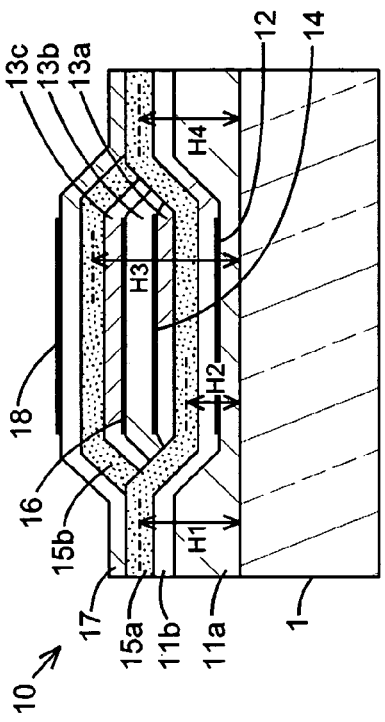
Figure 13:
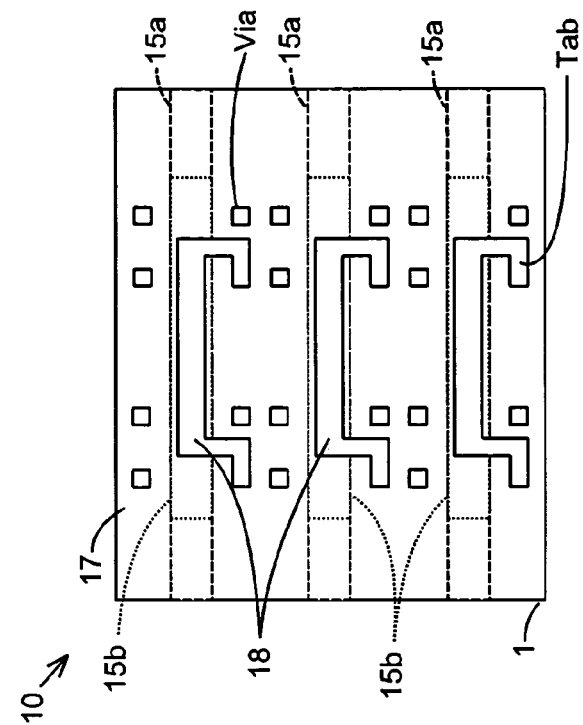

Next, referring to FIGS. 12 and 13, a third intermediate cladding layer 13$c$ is formed and patterned. Preferably, layer 13$c$ comprises a polymeric material, and is partially cured or fully cured after it has been patterned. Cladding layer 13$c$ may comprise a photosensitive material, and may be patterned by conventional photolithography techniques. The thickness of cladding layer 13$c$ is typically the same as that of second lower cladding layer 11$b$, values of which were given above. As seen in the top plan view of FIG. 13, the aerial extent of layer 13$c$ may be relatively small, substantially only covering the area of recess 21 formed in a prior step (see FIG. 4). This is because layers 13a and 13b generally have sufficient thickness to full in the low-lying areas, and there is no need to extend layer 13c to locations outside of recess 21 for the purpose of planarizing the substrate surface.

Figure 14:
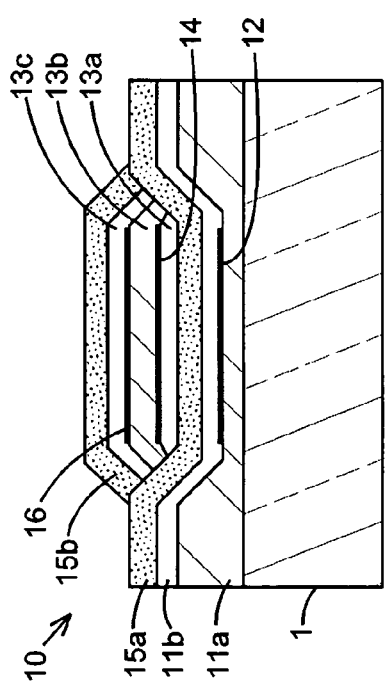
Figure 15:
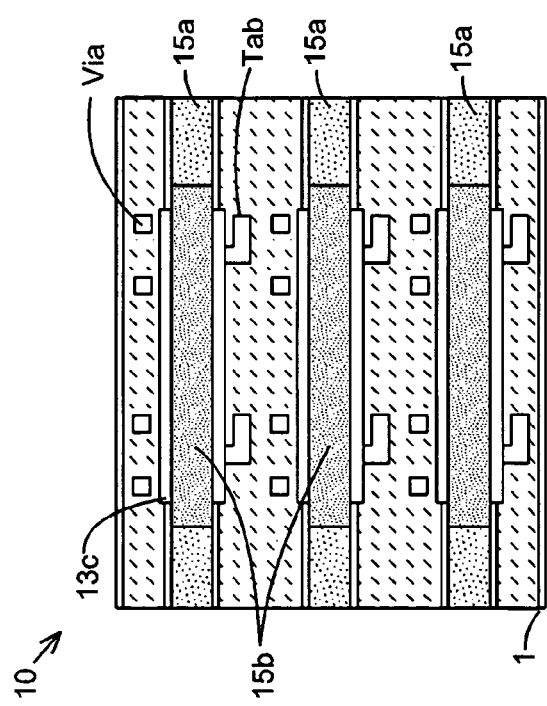

Next, referring to FIGS. 13 and 14, a second core layer 15b is conformally formed over the resulting substrate surface, and thereafter patterned to define elongated strips of core material, as shown in the top plan view of FIG. 15. Second core layer 15b may comprise a photosensitive material, and can be defined by conventional photolithography techniques. After it is patterned, the strips of core layer 15b may be partially cured or fully cured to increase their resistance to subsequent patterning steps for subsequently formed layers. Third intermediate cladding layer 13c provides an optical spacing distance between electrodes 16 and the strips of second core layer 15b. The thickness of second core layer 15b is typically the same as that of first core layer 15a, values of which are discussed above.

Next, an upper cladding layer 17 is formed and patterned. Preferably, layer 17 comprises a polymeric material, and is partially cured or fully cured after it has been patterned. Cladding layer 17 may comprise a photosensitive material, and may be patterned by conventional photolithography techniques. The thickness of cladding layer 17 is typically the same as that of second lower cladding layer 11b, values of which are given above. Next, fourth electrodes 18 are formed in a manner similar to that described for the previously formed electrodes 12, 14, and 16. Like those electrodes, each of fourth electrodes 18 is shown having two tabs. The partial curing or full curing of a polymeric cladding layer 17 improves the adhesion of electrodes 18 to layer 17. Upper cladding layer 17 provides an optical spacing distance between electrodes 18 and the strips of second core layer 15b, and in this regard serves a similar function as third intermediate cladding layer 13c. Upper cladding layer 17 need only be disposed in the areas where fourth electrodes 18 are located. However, as seen in FIG. 15, layer 17 preferably covers the entire surface of the substrate. This provides a uniform cladding layer around the strips of second core layer 15b, and also provides an overall passivation layer for the device. In this case, via holes are formed in layer 17 in the areas located over the previously-formed via connections to electrodes 12, 14 and 16. The via holes in layer 17 are filled with conductive material that makes electrical contact to the previously formed vias, thereby making stacked vias.

In preferred embodiments, the tapered regions of core strips 15a and 15b are made substantially the same to provide for symmetric optical paths. This can generally be achieved by making the depth of recess 21 substantially equal to the sum of: one-half the thickness of first core layer 15a, plus one-half the thickness of cladding layer 13b, plus the thickness of cladding layer 13a, plus the thickness of electrode 14, and plus the thickness of electrode 12.

As indicated above, some electro-optic material must be provided in order to provide a Mach-Zehnder modulator. For this, one or more of the core layers 15a, 15b and cladding layers 13, 15, and 17 may comprise electro-optic material. There are several known configurations of electro-optic materials that can be used, and the particular choice is not critical to practicing the present invention. A typical configuration, which is best suited for a modulator where both paths (i.e., branches 15-2 and 15-3) are modulated, is to use electro-optic material for both of core layers 15a and 15b. This configuration can be augmented to further use electro-optic material for cladding layers 11b, 13a, and 17. The cladding layers may comprise the same electro-optic material as that used for the core layers, with the minor addition of a material having a lower refractive index, so as to provide the cladding layers with refractive indices that are lower than those of the core layers.

A second exemplary optical device 10' and methods for making the same are illustrated in FIGS. 16–25. Optical device 10' is similar to optical device 10 except that electrodes 12–18 are formed to the lateral sides of core bodies 15a and 15b, rather than to the top and bottom surfaces of the core bodies. In optical device 10', second lower cladding layer 11b, first intermediate cladding layer 13a, and third intermediate cladding layer 13c are not needed (because the electrodes are formed to the side), but may be included if desired.

Figure 16:
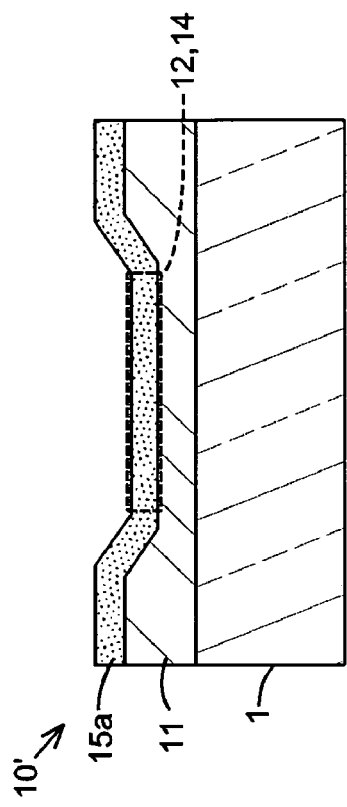
FIGS. 16–25 illustrate a second exemplary set of compact optical devices and exemplary methods of forming them according to the present invention.
Figure 17:
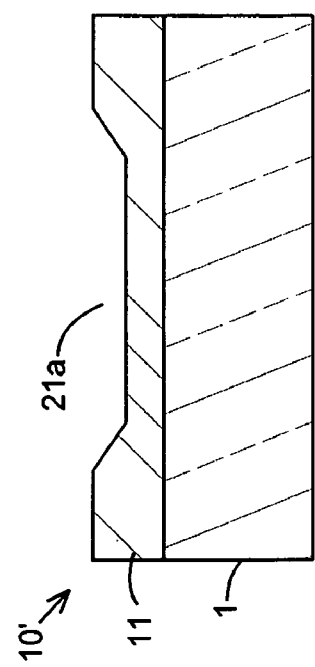

Referring to FIGS. 16 and 17, lower cladding layer 11 is formed on substrate 1. The methods of forming and processing layer 11 may be the same as those described above for lower cladding layer 11a. Next, a recess 21a with sloped surfaces is formed in lower cladding layer 11, as shown in FIG. 16. Typically, the angle of the sloped surfaces is relatively low, being in the range of 10 degrees to 30 degrees. Recess 21a will serve as a mold in which the core bodies of the lower branch waveguides (15-4, 15-2, and 15-7) will be formed. As shown in FIG. 17, side recesses 21b are also made to each side of recess 21a. Lateral electrodes 12 and 14 will be formed in these recesses in a subsequent step. Recesses 21b preferably have sloped surfaces as shown in FIG. 17 where the tabs to the electrodes are to be formed. Each sloped surface is formed along a portion of where a tab is located, and minimizes the chance of breakage in the electrode material during the fabrication process. Recesses 21a and 21b may be formed by the same processes described above for forming recess 21, including the use of grayscale photo-lithographic masks and photosensitive cladding materials. If a polymeric material is used for cladding layer 11 and if electrodes 12 and 14 are to be used in the device), layer 11 is preferably cured or partially cured to improve the adhesion of the metal electrode to it.

The depth of recess 21a may be less than that for recess 21 described above since the vertical electrodes and associated spacer cladding layers 11b, 13a, and 13c are not used in device 10'. The depth of recesses 21b for electrodes 12 and 14 can be the same as that for recesses 21a, or can be less, such as approximately one-half the depth of recess 21a. Electrodes 12 and 14 typically have the same thickness of core bodies 15a, and are typically positioned at the same level of core bodies 15a. However, electrodes 12 and 14 may be thinner than the thickness of core bodies 15a, such as one-fourth to one-half the thickness of core bodies 15a. In this case, the depth of recesses 21b can be less than that of recesses 21a, preferably so as to position the electrodes substantially at the optical axis of core bodies 15a. For example, the depth Db of recess 21b may be related to the depth Da of recess 21a as follows: $Db=Da-\frac{1}{2}*(T_{CB}-T_E)$, where $T_{CB}$ is the thickness of core bodies 15a, and $T_E$ is the thickness of electrodes 12 and 14. As shown in FIG. 17, there is a wall of lower cladding layer 11 that separates each recess 21a from each of the adjacent side recesses 21b. The wall provide optical spacing distances between each core body 15a and the adjacent lateral electrodes 12 and 14. The width of the wall typically ranges between 5 μm and 10 μm when the light conveyed through core bodies 15a is single-mode, and typically ranges between 15 μm and 30 μm when the conveyed light is multimode.

Figure 18:
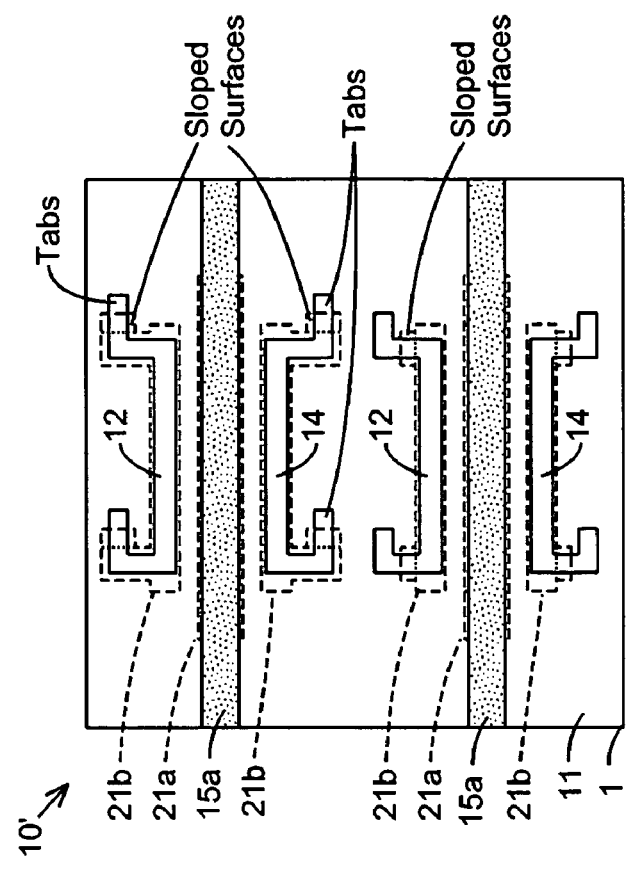
Figure 19:
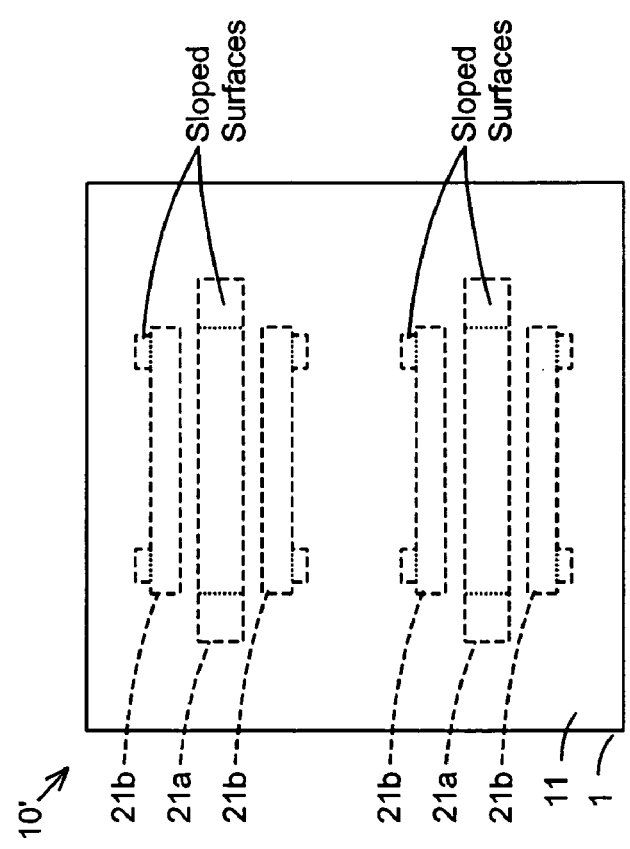

Next, referring to FIGS. 18 and 19, first core layer 15*a* is conformally formed over lower cladding layer 11, and thereafter patterned to define elongated strips of core material running through each recess 21*a*, as shown in the top plan view of FIG. 19, thereby forming the core bodies 15*a*. As before, first core layer 15*a* may comprise a photosensitive material, and can be defined by conventional photolithography techniques. After it is patterned, the strips of core layer 15*a* may be partially cured or fully cured to increase their resistance to subsequent patterning steps for subsequently formed layers. As before, the thickness of first core layer 15*a* typically ranges between 5 µm and 9 µm when the light conveyed through core segments 15 is single-mode, and typically ranges between 12 µm and 30 µm when the conveyed light is multimode. Layers greater than about 12 µm are typically made from several thinner conformal layers of material.

Either before or after first core bodies 15*a* are formed, electrodes 12 and 14 are formed in respective recesses 21*b*. The electrodes can be formed by electroplating (electroless or electrolytic), sputtering, other metal formation methods, or a combination thereof. Each of these formation processes uses one or more masks to define the pattern of the deposited metal to conform to the shapes illustrated in FIG. 19. These formation processes are well known to the art, and a detailed description thereof is not needed for a person of ordinary skill in the art to make and use the present invention. Electrodes 12 and 14 may comprises thick solid traces of metal, or may comprise a thin layer of metal coated on the bottom and side surfaces of each recess 21*b*, with the remained of the recess filled with a non-conductive material (e.g., polymeric cladding material). In general, for metal thicknesses greater 3 µm, electroless electroplating or electrolytic electroplating (or a combination thereof) are preferred when making thick solid metal electrodes.

Figure 20:
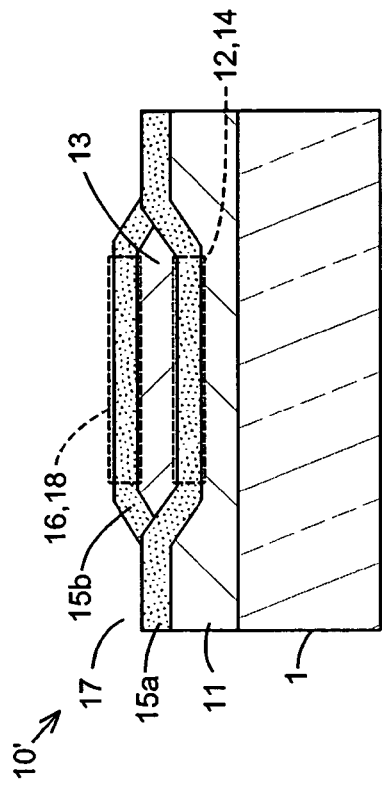
Figure 21:
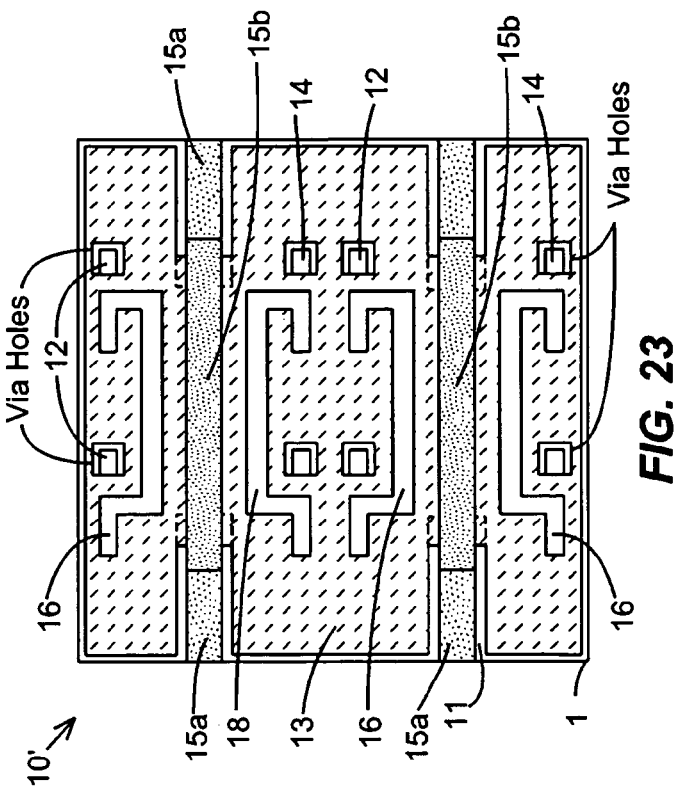

Next, referring to FIGS. 20 and 21, an intermediate cladding layer 13 is formed and patterned. Preferably, layer 13 comprises a polymeric material, and is partially cured or fully cured after it has been patterned. Cladding layer 13 may comprise a photosensitive material, and may be patterned by conventional photolithography techniques. Intermediate cladding layer 13 need only be disposed in the areas wherein the second core bodies 15*b* and electrodes 16 and 18 are to be formed. However, as seen in FIG. 21, layer 13 can be extended to the areas between the future locations of core bodies 15*b* and electrode 12,14, and can be further extended to all areas of the substrate except for those area where core bodies 15*a* lie outside of recesses 21*a*. The first extension of layer 13 provides for planarity between second core bodies 15*b* and electrodes 16,18, which are formed in subsequent steps described below in greater detail. The second extension of layer 13 helps to maintain the overall planarity of the substrate by raise the low-lowing areas of the substrate up to the uppermost height of core bodies 15*a*. When extending layer 13 over those areas that tabs of the electrodes 12 and 14, via holes are formed in layer 13 in the areas located over the ends of the tabs of electrodes 12 and 14, as shown in FIG. 21. The via holes in layer 13 are subsequently filled with conductive material that makes electrical contact to the tab ends.

Layer 13 preferably has portions with sloped surfaces, the portions being located adjacent to the angled portions of core bodies 15*a*. These portions are indicated as "sloped surfaces" in FIG. 21, and are preferably sloped downward to facilitate the subsequent interconnection of the strips of second core layer 15*b* to the strips of first core layer 15*a*. The downward slope can be achieved by a number of approaches. A straightforward approach comprises using a positive-tone photosensitive material for layer 13, and patterning layer 13 with a grayscale photolithographic mask. The grayscale mask would be completely opaque in those areas where layer 13 is placed, would be highly transparent in those areas where layer 13 is to be completely removed, and would have a gradation of opacity in the areas where the slope is to occur.

Figure 22:
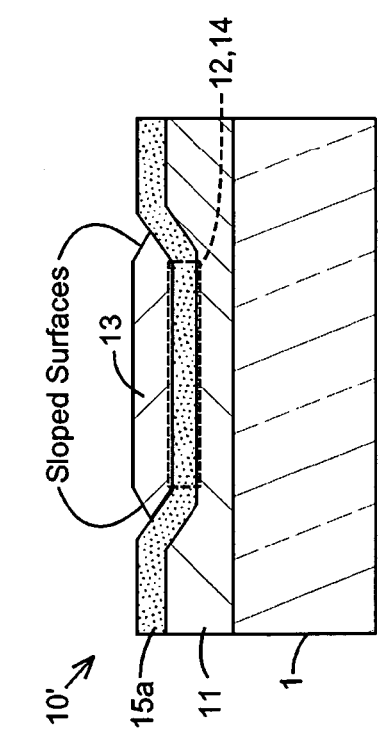
Figure 23:
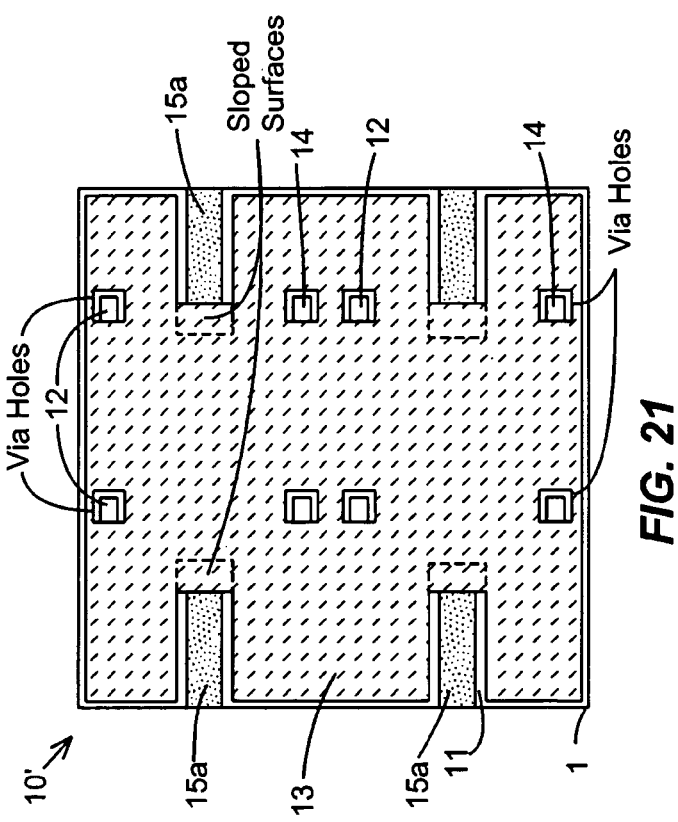
Figure 24:
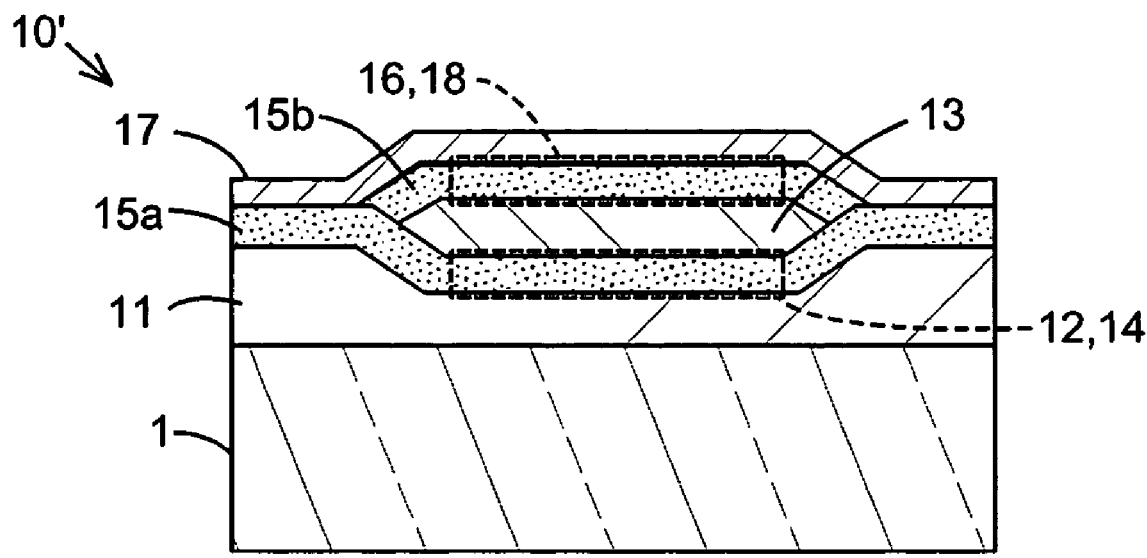
Figure 25:
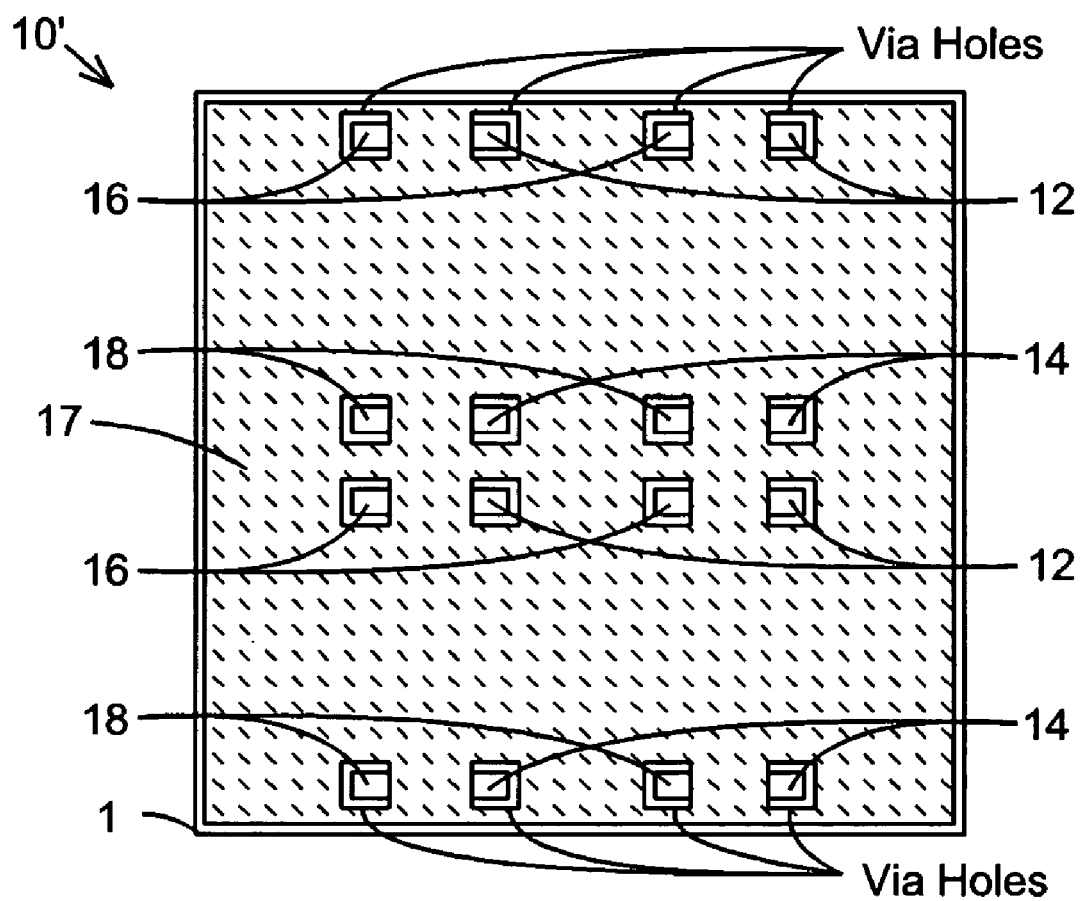

Next, referring to FIGS. 22 and 23, a second core layer 15*b* is conformally formed over the resulting substrate surface, and thereafter patterned to define elongated strips of core material, as shown in the top plan view of FIG. 23. Second core layer 15*b* may comprise a photosensitive material, and can be defined by conventional photolithography techniques. After it is patterned, the strips of core layer 15*b* may be partially cured or fully cured to increase their resistance to subsequent patterning steps for subsequently formed layers. The thickness of second core layer 15*b* is typically the same as that of first core layer 15*a*, values of which are discussed above.

Either before or after second core bodies 15*b* are formed, electrodes 16 and 18 are formed to the lateral sides of the locations of core bodies 15*b*. The electrodes can be formed by electroplating (electroless or electrolytic), sputtering, other metal formation methods, or a combination thereof. Each of these formation processes uses one or more masks to define the pattern of the deposited metal to conform to the shapes illustrated in FIG. 23. These formation processes are well known to the art, and a detailed description thereof is not needed for a person of ordinary skill in the art to make and use the present invention. Electrodes 16 and 18 may comprises thick solid traces of metal, or may comprise a thin layer of metal coated over the top and side surfaces of body of non-conductive material (e.g., polymeric cladding material) having the desired shape of the electrode. The processes for forming electrodes 12 and 14 may be used to form electrodes 16 and 18.

Figure 26:
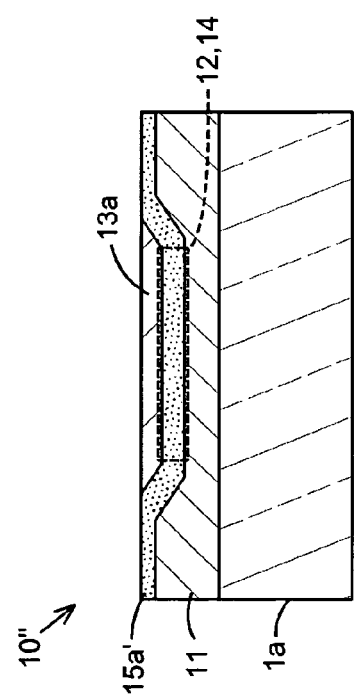
FIGS. 26–29 illustrate a third exemplary set of compact optical devices and exemplary methods of forming them according to the present invention.

A third exemplary optical device 10" and methods for making the same are illustrated in FIGS. 26–29. Optical device 10" is similar to optical device 10' except that it is formed in two support layers, which are joined together at a final step. Referring to FIG. 26, lower cladding layer 11 is formed and patterned on a first substrate 1*a* as before, and first core bodies 15*a*' are formed and patterned in a similar manner as first core bodies 15*a* described above except that the thickness at the distal ends of the core bodies 15*a*' may be made half as thick. Electrodes 12 and 14 are also formed in a similar manner as described above for device 10'. Also, an intermediate cladding layer 13*a* is formed and patterned in a similar manner as described above for cladding layer 13 of device 10', except that layer 13*a* is patterned (preferably with a grayscale mask) to planarize the surface of the resulting substrate in at least the areas where layer 13*a* overlays the core bodies 15*a*', as shown in the figure, and preferably over at least a major portion of the surface. This can be readily done by designing the grayscale mask used to define layer 13*a* to vary the thickness of the layer (including step changes and graded changes in thickness) to complement the topology of the surface that exists after elements 11, 12, 14, and 15*a*' have been formed. Next, electrical traces and vias (not shown in the figure) are formed over the resulting substrate surface to electrically connect with electrodes 12 and 14. The ends of the traces are routed to points to the side of the device that will allow for convenient connections to the finished device. Portions of the electrical traces for electrodes 16 and 18 may also be formed at this step of the process, which can interconnect with traces formed in a subsequent step described below.

Figure 27:
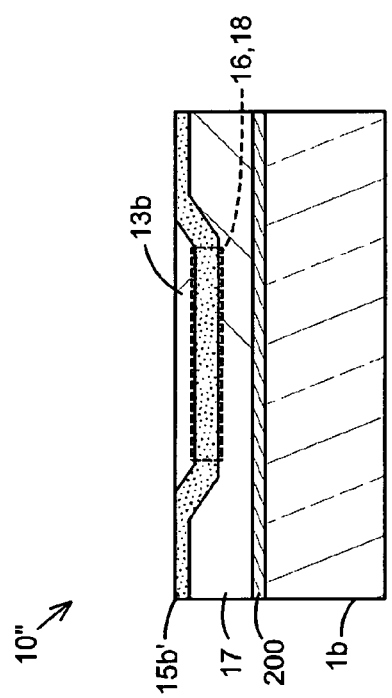
Figure 29:
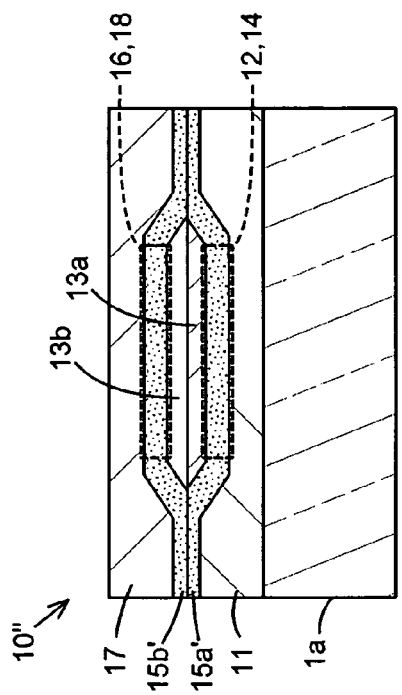

Referring to FIG. 27, upper cladding layer 17 is formed over a substrate 1b in a manner similar to the formation of lower cladding layer 11, as described above. As shown in FIG. 27, it may be formed over a release layer 200 that subsequently enables layer 17 (and the elements formed above it), to be separated from the underlying substrate 1b, which may be the same or different from the substrate 1a used in the process illustrated in FIG. 26. Second core bodies 15b' are formed and patterned in a similar manner as first core bodies 15a' described above, and electrodes 16 and 18 are formed in a similar manner as described above for electrodes 12 and 14. Also, an intermediate cladding layer 13b is formed and patterned in a similar manner as described above for intermediate cladding layer 13a. Next, electrical traces and vias (not shown in the figure) are formed over the resulting substrate surface to electrically connect with electrodes 16 and 18. The ends of the traces are routed in a manner that will allow for convenient connections to the finished device. As indicated above, a first portion of these electrical traces may be formed over the surface of the first substrate 1a to provide a convenient connection point (e.g., grouped together with the traces for electrodes 12 and 14), and the remaining portion may be formed on substrate 1b and positioned to interconnect with corresponding traces of the first portion when the two parts of the device are joined together in a subsequent step described below.

It may be appreciated that elements 17, 15b', 16, 18 and 13b may be formed on the same substrate as elements 11, 15a', 12, 14, and 13a in a simultaneous manner. That is to say, layers 11 and 17 may be formed as a common layer on a common substrate and then patterned with recesses at different locations on the common substrate; then core bodies 15a' and 15b' may be formed and patterned at the same time; then electrodes 12, 14, 16, and 18 may be formed and patterned at the same time; followed by layers 13a and 13b being formed as a common layer and patterned. In this implementation, release layer 200 may be formed over the entire common substrate. Once the elements are formed on a common substrate, the common substrate may be diced to separate one set of elements from another on separate substrates 1a and 1b.

Figure 28:
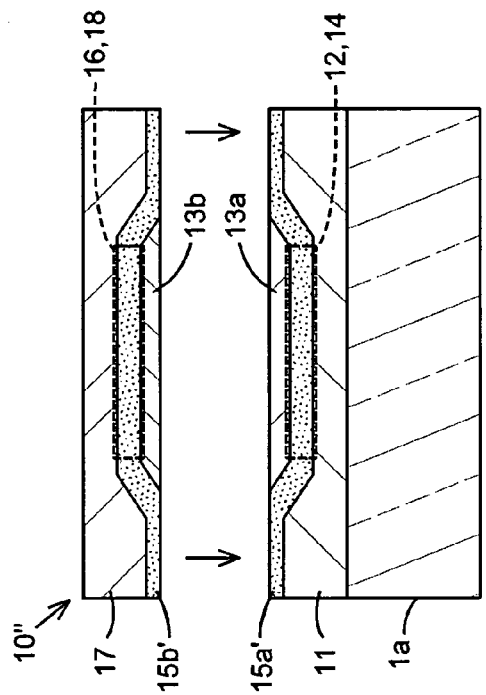

Referring to FIG. 28, elements 13b, and 15b'–18 are separated from the underlying substrate 1b by removing separation layer 200 with a suitable etchant. The separated layer is then inverted and disposed over elements 11–15a' and aligned thereto. Next, the separated layer is pressed against the layer having elements 11–15a' and adhered thereto. The adhesion may be accomplished by having layers 13a and 13b and core bodies 15a' and 15b' in partially cured states beforehand, and then applying heat during the pressing step. The heat and pressure causes the opposing layers to adhere to one another, and continued application after the initial bonds have been made may be used to further cure or fully cure the layers. (Alternatively, conventional heating in ovens may be used to fully cure the layers.) As a result, an interfacial adhesion surface is formed at the joint layers, and the interfacial adhesion layer can be visually detected by cross-sectioning the device. If portions of electrical traces on one layer are to be interconnected with portions on the other layer, then thin films of solder may be formed on these traces at appropriate locations before the joining step, and the pressure and heat applied during the joining step provides soldered connections between traces on opposing layers.

The third embodiment enables the manufacture of the optical devices to be done in parallel, and enables good homogeneity between the top and the bottom branches of the devices to be achieved by enabling both to be made on the same substrate. While the embodiment has been illustrated with the shapes of core bodies 15a' and 15b' being substantially the same and having half thicknesses at their distal ends, it may be appreciated that one set of core bodies (e.g., 15a') may have full thicknesses at their distal ends while the opposing set of core bodies (e.g., 15b') may have zero thickness at their distal ends. Also, while the third embodiment has been illustrated with electrodes 12, 14, 16, and 18 disposed to the lateral sides of core bodies 15a' and 15b', it may be appreciated that the electrodes may be vertically stacked above and below the core bodies, as in the case of device 10.

Thus, referring back to FIG. 3, the waveguide segments provided by core segments 15-2, 15-4, 15-7, and some or all of core segments 15-1 and 15-6 may be formed in a first support layer, and the waveguide segments provided by core segments 15-3, 15-5, 15-8, and some or all of core segments 15-1 and 15-6 may be formed in a second support layer, and the first and second support layers may be joined together at an interfacial adhesion surface.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. An optical device comprising:
   a support layer having a top surface and a bottom surface;
   a first waveguide segment disposed above the top surface, and having a first end, a second end, and an axis of light propagation spaced above the top surface by a first height;
   a second waveguide segment disposed above the top surface, and having a first end, a second end, and an axis of light propagation spaced above the top surface by a second height, the second height being less than the first height;
   a third waveguide segment disposed above the top surface, and having a first end, a second end, and an axis of light propagation spaced above the top surface by a third height, the third height being greater than the first height and the second height;
   a fourth waveguide segment that couples the second end of the first waveguide segment to the first end of the second waveguide segment;
   a fifth waveguide segment that couples the second end of the first waveguide segment to the first end of the third waveguide segment; and
   a first electrode disposed adjacent to at least one of the second and third waveguide segments.

2. The optical device of claim 1 wherein the third waveguide segments is disposed directly over the second waveguide segment.

3. The optical device of claim 1 further comprising:
   a sixth waveguide segment disposed above the top surface, and having a first end, a second end, and an axis of light propagation spaced above the top surface by a fourth height, the fourth height being equal to or greater than the second height and less than or equal to the third height;

a seventh waveguide segment that couples the second end of the second waveguide segment to the first end of the sixth waveguide segment; and an eighth waveguide segment that couples the second end of the third waveguide segment to the first end of the sixth waveguide segment.

4. The optical device of claim 1 wherein the first electrode is disposed between the support layer and the second waveguide segment, and wherein the optical device further comprises:

a first cladding layer disposed between the first electrode and the second waveguide segment;

a second electrode disposed above the second waveguide segment; and a second cladding layer disposed between the second electrode and the second waveguide segment; and wherein at least one of the second core segment and the first and second cladding layers comprises an electro-optic material.

5. The optical device of claim 4 wherein the second core segment comprises an electro-optic material.

6. The optical device of claim 5 wherein at least one of the first and second cladding layers comprises an electro-optic material.

7. The optical device of claim 4 further comprising:

a third electrode disposed below the third waveguide segment and above the second electrode;

a third cladding layer disposed between the third electrode and the third waveguide segment;

a fourth electrode disposed above the third waveguide segment; and a fourth cladding layer disposed between the fourth electrode and the third waveguide segment.

8. The optical device of claim 7 wherein the third core segment comprises an electro-optic material.

9. The optical device of claim 8 wherein at least one of the third and fourth cladding layers comprises an electro-optic material.

10. The optical device of claim 1 wherein the first electrode is disposed above the third waveguide segment, and wherein the optical device further comprises:

a fourth cladding layer disposed between said first electrode and the third waveguide segment.

11. The optical device of claim 1 wherein the first electrode is disposed below the third waveguide segment and above the second waveguide, and wherein the optical device further comprises:

a first cladding layer disposed between the first electrode and the third waveguide segment;

a second electrode disposed above the third waveguide segment; and a second cladding layer disposed between the second electrode and the third waveguide segment; and wherein at least one of the third core segment and the first and second cladding layers comprises an electro-optic material.

12. The optical device of claim 11 wherein the third core segment comprises an electro-optic material.

13. The optical device of claim 12 wherein at least one of the first and second cladding layers comprises an electro-optic material.

14. An optical device comprising:

a support layer having a top surface and a bottom surface;

a first waveguide segment disposed above the top surface, and having a first end, a second end, and an axis of light propagation spaced above the top surface by a first height;

a second waveguide segment disposed above the top surface, and having a first end, a second end, at least two lateral sides, and an axis of light propagation spaced above the top surface by a second height, the second height being less than the first height;

a third waveguide segment disposed above the top surface, and having a first end, a second end, and an axis of light propagation spaced above the top surface by a third height, the third height being greater than the first height and the second height;

a fourth waveguide segment that couples the second end of the first waveguide segment to the first end of the second waveguide segment;

a fifth waveguide segment that couples the second end of the first waveguide segment to the first end of the third waveguide segment;

a first electrode disposed to one lateral side of the second waveguide segment;

a first body of cladding material disposed between the first electrode and the second waveguide segment;

a second electrode disposed to another lateral side of the second waveguide segment; and a second body of cladding material disposed between the second electrode and the second waveguide segment; and wherein at least one of the second core segment and the first and second bodies cladding material comprises an electro-optic material.

15. The optical device of claim 14 wherein the second core segment comprises an electro-optic material.

16. The optical device of claim 15 wherein at least one of the first and second bodies of cladding material comprises an electro-optic material.

17. The optical device of claim 14 wherein the third waveguide segment has at least two lateral sides, and wherein the optical device further comprises:

a third electrode disposed to one lateral side of the third waveguide segment;

a third body of cladding material disposed between the third electrode and the third waveguide segment;

a fourth electrode disposed to another lateral side of the third waveguide segment; and a fourth body of cladding material disposed between the fourth electrode and the third waveguide segment.

18. The optical device of claim 17 wherein the third core segment comprises an electro-optic material.

19. The optical device of claim 18 wherein at least one of the third and fourth bodies of cladding material comprises an electro-optic material.

20. The optical device of claim 1 wherein the third waveguide segment has at least two lateral sides, and wherein the optical device further comprises:

a first electrode disposed to one lateral side of the third waveguide segment;

a first body of cladding material disposed between the first electrode and the third waveguide segment;

a second electrode disposed to another lateral side of the third waveguide segment; and a second body of cladding material disposed between the second electrode and the third waveguide segment; and wherein at least one of the third core segment and the first and second bodies of cladding material comprises an electro-optic material.

21. An optical device comprising:

a support layer having a top surface and a bottom surface;

a first waveguide segment disposed above the top surface, and having a first end, a second end, and an axis of light propagation spaced above the top surface by a first height;

a second waveguide segment disposed above the top surface, and having a first end, a second end, and an axis of light propagation spaced above the top surface by a second height, the second height being less than the first height;

a third waveguide segment disposed above the top surface, and having a first end, a second ends and an axis of light propagation spaced above the top surface by a third height, the third height being greater than the first height and the second height;

a fourth waveguide segment that couples the second end of the first waveguide segment to the first end of the second waveguide segment;

a fifth waveguide segment that couples the second end of the first waveguide segment to the first end of the third waveguide segment;

a first intermediate cladding layer disposed above the second waveguide segment;

a second intermediate cladding layer disposed between the third waveguide segment and the first intermediate cladding layer; and a visually-detectable adhesion surface disposed between at least the first and second intermediate cladding layers; and wherein the first intermediate cladding layer and the second waveguide and fourth waveguide segments are formed in a first support layer, wherein the second intermediate cladding layer and the third and fifth waveguide segments are formed in a second support layer, wherein the first waveguide segment is formed in at least one of the first and second support layers, and wherein the first and second support layers are joined together at said interfacial adhesion surface.

22. A method of forming an optical device comprising the steps of:

(a) forming a recess in a support layer, the recess having a first tapered end and a second tapered end;

(b) forming a first strip of core material such that at least a portion of the first strip is disposed along the recess, the first tapered end, and the second tapered end;

(c) forming a first cladding layer over a portion of the first strip of core material that lies within the recess;

(d) forming a second strip of core material over the first cladding layer such that the second strip contacts a first portion of the first strip that is disposed over the first tapered end, and contacts a second portion of the first strip that is disposed over the second tapered end.

23. The method of claim 22 further comprising the steps of:

prior to step (b), forming a first electrode within the recess, located under a portion of the first strip of core material; and prior to step (b) forming a second cladding layer over the first electrode.

24. The method of claim of claim 23 further comprising the steps of:

prior to step (c), forming a third cladding layer over a portion of the first strip of core material that lies within the recess;

prior to step (c), forming a second electrode over the third cladding layer.

25. The method of claim 24 further comprising the steps of:

prior to step (d), forming a third electrode on the first cladding layer, the third electrode being located under a portion of the second strip of core material;

prior to step (d) forming a fourth cladding layer over the third electrode.

26. The method of claim 25 further comprising the steps of:

after step (d), forming a fifth cladding layer over the second strip of core material;

after step (d), forming a fourth electrode over the fifth cladding layer.

27. A method of forming an optical device comprising the steps of:

(a) forming a first support layer having a top surface, a bottom surface, a first core body disposed between the top and bottom surfaces, a second core body disposed between the top and bottom surfaces, and cladding material disposed around at least a portion of the first and second core bodies, the first core body have a first end, a second end, and an axis of light propagation substantially parallel to the top surface of the first support layer, the second core body having a first end disposed at the second end of the first core body, a second end disposed closer to the top surface than the bottom surface the first support substrate, and an axis of light propagation that is at an angle to the top surface of the first support substrate;

(b) forming a second support layer having a top surface, a bottom surface, a third core body disposed between the top and bottom surfaces, a fourth core body disposed between the top and bottom surfaces, and cladding material disposed around at least a portion of the third and fourth core bodies, the third core body have a first end, a second end, and an axis of light propagation substantially parallel to the top surface of the second support layer, the fourth core body having a first end disposed at the second end of the third core body, a second end disposed closer to the top surface than the bottom surface the second support substrate, and an axis of light propagation that is at an angle to the top surface of the second support substrate;

(c) forming a fifth core body at the top surface of one of the first and second support layers, the fifth core body having a first end disposed at the second end of one the second or fourth core body; and (d) joining the first and second support layers together at their top surfaces.

28. The method of claim 27 wherein the fifth core body is formed at the top surface of the first support layer, wherein the first end of the fifth core body is disposed at the second end of the second core body, and wherein step (c) further comprises forming a sixth core body at the top surface of the second support layer, the sixth core body having a first end disposed at the second end of the fourth core body.

* * * * *